(12) United States Patent
Watanabe et al.

(10) Patent No.: US 9,255,511 B2
(45) Date of Patent: Feb. 9, 2016

(54) EXHAUST PURIFICATION SYSTEM AND METHOD FOR CONTROLLING EXHAUST PURIFICATION SYSTEM

(75) Inventors: Masanori Watanabe, Saitama (JP); Takeshi Miyamoto, Saitama (JP); Fumiyasu Kurogi, Saitama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 13/997,608

(22) PCT Filed: Dec. 21, 2011

(86) PCT No.: PCT/JP2011/079583
§ 371 (c)(1),
(2), (4) Date: Jun. 24, 2013

(87) PCT Pub. No.: WO2012/090801
PCT Pub. Date: Jul. 5, 2012

(65) Prior Publication Data
US 2013/0269321 A1    Oct. 17, 2013

(30) Foreign Application Priority Data
Dec. 27, 2010   (JP) .................................. 2010-290258

(51) Int. Cl.
*F01N 3/00*   (2006.01)
*F01N 3/20*   (2006.01)
(Continued)

(52) U.S. Cl.
CPC ................ *F01N 3/208* (2013.01); *F01N 3/023* (2013.01); *B01D 53/9495* (2013.01);
(Continued)

(58) Field of Classification Search
CPC . F01N 3/035; F01N 3/208; F01N 2900/1622; F01N 3/023; F01N 13/0097; F01N 3/2066; F01N 3/2892; F01N 3/30; F01N 9/002; F01N 3/0821; Y02T 10/24
USPC .................................................... 60/272–324
See application file for complete search history.

(56) References Cited

U.S. PATENT DOCUMENTS

| 5,894,013 A | 4/1999 | Takada |
|---|---|---|
| 7,594,393 B2 | 9/2009 | Offenhuber et al. |

(Continued)

FOREIGN PATENT DOCUMENTS

| CN | 1184698 | 6/1998 |
|---|---|---|
| EP | 1176292 | 1/2002 |

(Continued)

OTHER PUBLICATIONS

International Search Report for Application No. PCT/JP2011/079583 dated Mar. 19, 2012 (1 page).

*Primary Examiner* — Jesse Bogue
*Assistant Examiner* — Kelsey Stanek
(74) *Attorney, Agent, or Firm* — Michael Best & Friedrich LLP

(57) ABSTRACT

Provided is an exhaust purification system capable of clearing a blockage of a reducing agent injection valve caused by solidification of an aqueous urea solution soon after starting an engine and preventing degradation in exhaust purification efficiency when starting an internal combustion engine. An exhaust purification system with a DPF, a reducing agent injection valve, and an SCR catalyst in order from the exhaust upstream side includes: an operation state detecting unit capable of detecting starting and stopping of the internal combustion engine; a forced regeneration control unit which performs forced regeneration of the DPF; a condition establishment determining unit which determines whether there is a possibility of solidification of the aqueous urea solution when the operation state detecting unit detects that the internal combustion engine is stopped; a data storage unit which stores the determination result of the condition establishment determining unit as data; and a blockage-clearing control unit which controls a temperature raising unit for raising the temperature of the reducing agent injection valve so as to raise the temperature of the reducing agent injection valve based on the data when starting the internal combustion engine.

5 Claims, 7 Drawing Sheets

(51) Int. Cl.
*F01N 3/023* (2006.01)
*B01D 53/94* (2006.01)

(52) U.S. Cl.
CPC ...... *F01N 2430/00* (2013.01); *F01N 2610/105* (2013.01); *F01N 2900/0402* (2013.01); *F01N 2900/1811* (2013.01); *Y02T 10/24* (2013.01)

(56) References Cited

U.S. PATENT DOCUMENTS

| | | |
|---|---|---|
| 2004/0179960 A1 | 9/2004 | Lenke |
| 2010/0205944 A1* | 8/2010 | Torisaka et al. ............ 60/297 |
| 2010/0242439 A1* | 9/2010 | Domon et al. ............ 60/274 |
| 2011/0030343 A1* | 2/2011 | Kiser et al. ............ 60/274 |
| 2011/0088372 A1* | 4/2011 | Yamamoto ............ 60/276 |
| 2011/0099983 A1* | 5/2011 | Ohno ............ 60/277 |

FOREIGN PATENT DOCUMENTS

| | | |
|---|---|---|
| JP | 2000027627 | 1/2001 |
| JP | 2005504208 | 2/2005 |
| JP | 2005-127318 | 5/2005 |
| JP | 2005248823 | 9/2005 |
| JP | 2008-138583 | 6/2008 |
| JP | 2010-270624 | 12/2010 |

\* cited by examiner

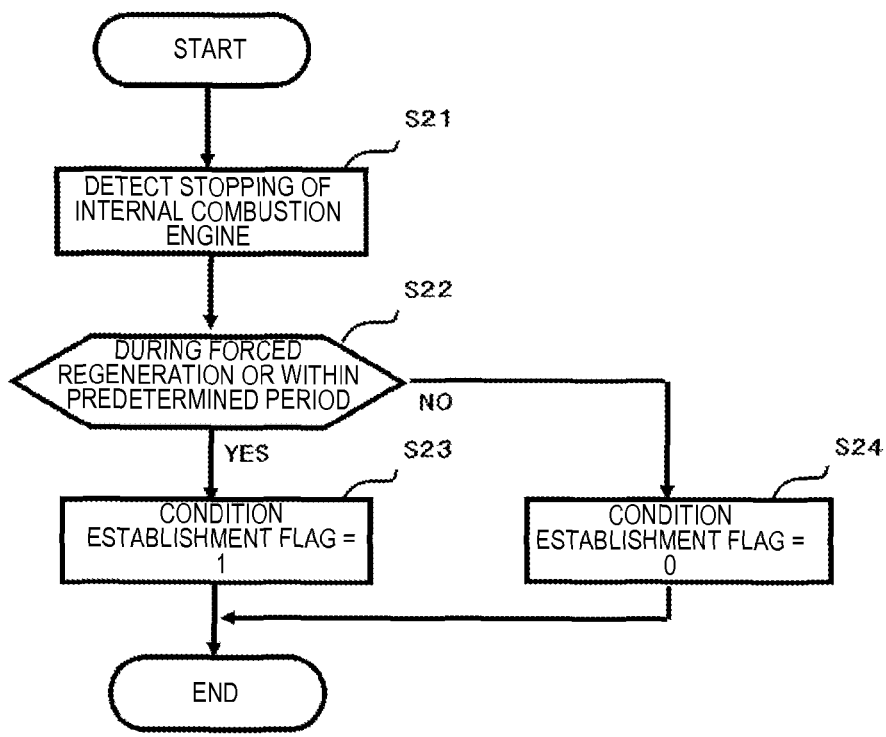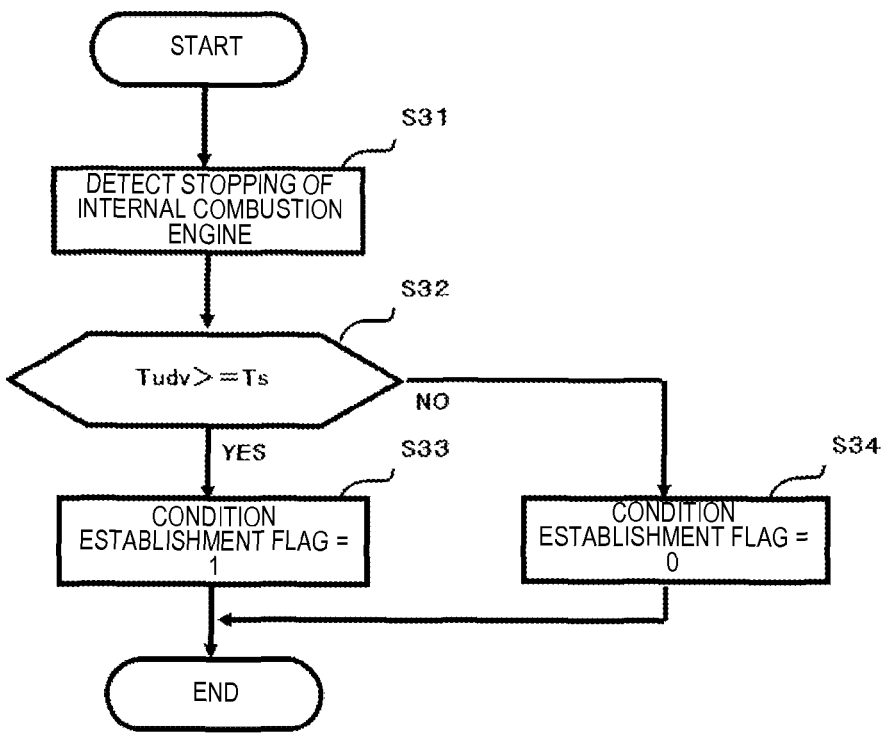

EXHAUST PURIFICATION SYSTEM AND METHOD FOR CONTROLLING EXHAUST PURIFICATION SYSTEM

BACKGROUND OF THE INVENTION

The present invention relates to an exhaust purification system and a method for controlling an exhaust purification system. In particular, the invention relates to an exhaust purification system and a method for controlling an exhaust purification system capable of clearing a blockage of a reducing agent injection valve caused by solidification of an aqueous urea solution.

Hitherto, an exhaust gas of an internal combustion engine mounted on a vehicle includes a nitrogen oxide (hereinafter, referred to as a "$NO_x$") or a particulate material (hereinafter, referred to as a "PM").

Among these, there is known a urea SCR system as a device which reduces the $NO_x$ so as to purify the exhaust gas. The urea SCR system includes a reducing agent supply device which supplies an aqueous urea solution as a reducing agent pumped up from a storage tank by a pressure-feeding pump from a reducing agent injection valve into an exhaust pipe and an SCR catalyst which is a kind of exhaust purification catalyst capable of adsorbing ammonia. In such a urea SCR system, ammonia which is produced by the decomposition of the aqueous urea solution is adsorbed to the SCR catalyst and the $NO_x$ in the exhaust gas reacts with the ammonia in the SCR catalyst, thereby purifying the exhaust gas.

Meanwhile, as a device which collects the PM to purify the exhaust gas, there is known a diesel particulate filter (hereinafter, referred to as a "DPF"). The DPF is disposed in the exhaust pipe of the internal combustion engine and collects the PM in the exhaust gas when the exhaust gas passes through the DPF. In the exhaust purification system including the DPF, in order to prevent the blockage of the DPF, forced regeneration control is performed at an appropriate timing in which the temperature of the DPF is increased to be about 500 to 600° C. so as to forcedly burn the PM deposited on the DPF.

In recent years, an exhaust purification system having both the DPF and the SCR catalyst increases in number as the purification standard of the exhaust gas becomes strict.

Incidentally, the urea SCR system is generally configured to collect the aqueous urea solution remaining in the reducing agent supply path when the internal combustion engine is stopped (for example, see JP 2009-215891 A). Accordingly, it is possible to prevent a problem in which the aqueous urea solution is frozen while remaining in the reducing agent supply path and blocks the reducing agent supply path.

SUMMARY OF THE INVENTION

However, in the exhaust purification system disclosed in JP 2009-215891 A, the aqueous urea solution inside the reducing agent injection valve is heated after the internal combustion engine is stopped, and the aqueous urea solution is solidified while being cooled later. As a result, there is a problem in which the supply of the aqueous urea solution is disturbed when starting the internal combustion engine and hence the exhaust purification efficiency is degraded.

Specifically, in the exhaust purification system, a purging process, which collects the aqueous urea solution charged in the reducing agent supply device into the storage tank when stopping the internal combustion engine, is generally performed, but there is a case in which the aqueous urea solution charged in the reducing agent supply device may not be completely collected into the storage tank due to the structure of the reducing agent path connecting the storage tank and the reducing agent injection valve to each other, or the like.

Meanwhile, since the circulation of the cooling water as the heat radiation function of the reducing agent injection valve is stopped with the stopping of the internal combustion engine, the temperature of the reducing agent injection valve increases. Then, the water content in the aqueous urea solution remaining inside the reducing agent injection valve exits therefrom by the evaporation, so that the concentration thereof increases. Subsequently, the temperature of the aqueous urea solution decreases with a decrease in the temperature of the exhaust pipe or the periphery thereof. However, since the concentration is higher than the normal concentration, the solidification temperature also increases, and the remaining aqueous urea solution is solidified. Accordingly, there is a possibility that the reducing agent injection valve may be blocked.

The concentration of the aqueous urea solution is generally adjusted to about 32.5%. In this case, the solidification temperature of the aqueous urea solution is about −11° C. When the concentration increases so as to exceed the percentage, there is a tendency that the solidification temperature of the aqueous urea solution increases. With regard to the aqueous urea solution remaining inside the reducing agent injection valve and having a high concentration due to the exit of the water content by a high temperature (see FIG. 10), the aqueous urea solution is easily solidified when the temperature decreases, and hence there is a possibility that the injection of the reducing agent injection valve is disturbed when restarting the internal combustion engine.

Therefore, the invention is made in view of such a problem, and the inventor of the invention has found out that such a problem may be solved by determining whether the aqueous urea solution heated first has a possibility of solidification thereof while being cooled and the temperature of the reducing agent injection valve is increased when starting the engine at the next time when such a possibility is present.

That is, it is an object of the invention to provide an exhaust purification system and a method for controlling an exhaust purification system capable of solving the blockage of the reducing agent injection valve caused by the solidification of the aqueous urea solution soon after starting an engine and preventing degradation in exhaust purification efficiency.

According to the invention, in an exhaust purification system with a DPF which collects exhaust particulates in an exhaust gas, a reducing agent injection valve which injects an aqueous urea solution as a reducing agent into the exhaust gas, and an SCR catalyst which purifies a $NO_x$ in the exhaust gas by using the aqueous urea solution, where these components are provided in order from the exhaust upstream side, the exhaust purification system including: an operation state detecting unit capable of detecting starting and stopping of an internal combustion engine; a condition establishment determining unit which determines whether there is a possibility of solidification of the aqueous urea solution when the operation state detecting unit detects the stopping of the internal combustion engine; a data storage unit which stores the determination result of the condition establishment determining unit as data; and a blockage-clearing control unit which controls a temperature raising unit for raising a temperature of the reducing agent injection valve based on the data when starting the internal combustion engine so as to raise the temperature of the reducing agent injection valve, is provided, and the problem described above can be solved.

In this way, it is determined whether there is a possibility of the solidification of the aqueous urea solution inside the reducing agent injection valve later when stopping the internal combustion engine, and the determination result is stored as the data. When such a possibility is present, the temperature raising unit is controlled so as to raise the temperature of the reducing agent injection valve when restarting the engine, so that the temperature of the aqueous urea solution solidified inside the reducing agent injection valve is raised so as to promptly melt the solidified aqueous urea solution.

Accordingly, since the blockage of the reducing agent injection valve may be cleared soon after starting the engine, degradation in the exhaust purification efficiency may be prevented.

Further, for configuring the invention, the condition establishment determining unit preferably determines that there is a possibility of solidification of the aqueous urea solution when the stopping of the internal combustion engine is detected while forced regeneration of the DPF is started and ended or within a predetermined period after the forced regeneration is ended.

In this way, the reducing agent injection valve at the downstream side of the DPF is exposed to a high temperature during the forced regeneration of the DPF and within the predetermined period after the forced regeneration is ended. Then, since the cooling function is not effectively exhibited after stopping the internal combustion engine and the concentration of the aqueous urea solution remaining inside the reducing agent injection valve increases, it is determined that there is a high possibility of the solidification.

Further, for configuring the invention, the condition establishment determining unit preferably determines whether there is a possibility of solidification of the aqueous urea solution based on at least one of a temperature of the reducing agent injection valve, a temperature gradient, and an external air temperature when the stopping of the internal combustion engine is detected.

Whether the aqueous urea solution is solidified after the internal combustion engine is stopped depends on the temperature thereof. Accordingly, it is possible to highly precisely detect the possibility of the solidification of the aqueous urea solution by the determination based on at least one of the temperature of the reducing agent injection valve, the temperature gradient, and the external air temperature.

Further, for configuring the invention, the temperature raising unit is preferably a forced regeneration unit of the DPF.

In this way, there is no need to separately provide the temperature raising unit by using the forced regeneration unit of the DPF.

Further, for configuring the invention, the temperature raising unit is preferably a unit using a burner.

In this way, since the temperature raising unit is the unit using the burner, it is possible to promptly clear the blockage of the reducing agent by heating the reducing agent injection valve at the downstream side by the combustion of the burner.

Furthermore, according to another aspect of the invention, in a method for controlling an exhaust purification system with a DPF which collects exhaust particulates in an exhaust gas, a reducing agent injection valve which injects an aqueous urea solution as a reducing agent into the exhaust gas, and an SCR catalyst which purifies a $NO_x$ in the exhaust gas by using the aqueous urea solution, where these components are provided in order from the exhaust upstream side, the method includes: determining whether there is a possibility of solidification of the aqueous urea solution when stopping of an internal combustion engine is detected and storing the determination result as data; and controlling a temperature raising unit for raising the temperature of the reducing agent injection valve so as to raise the temperature of the reducing agent injection valve when stored is the data representing the determination result in which there is a possibility of solidification of the aqueous urea solution when starting the internal combustion engine.

In this way, it is determined whether there is a possibility of the solidification of the aqueous urea solution inside the reducing agent injection valve later when stopping the internal combustion engine, and the determination result is stored as the data. When such a possibility of the solidification is present, the temperature raising unit is controlled so as to raise the temperature of the reducing agent injection valve when restarting the engine, so that the temperature of the aqueous urea solution solidified inside the reducing agent injection valve is raised so as to promptly melt the solidified aqueous urea solution.

Accordingly, it is possible to promptly clear the blockage of the reducing agent injection valve and hence to prevent degradation in the exhaust purification efficiency.

BRIEF DESCRIPTION OF THE DRAWINGS

FIG. 7 is a flowchart showing the method for controlling the exhaust purification system.

FIG. 8 is a flowchart showing the method for controlling the exhaust purification system.

DETAILED DESCRIPTION

Figure 1:
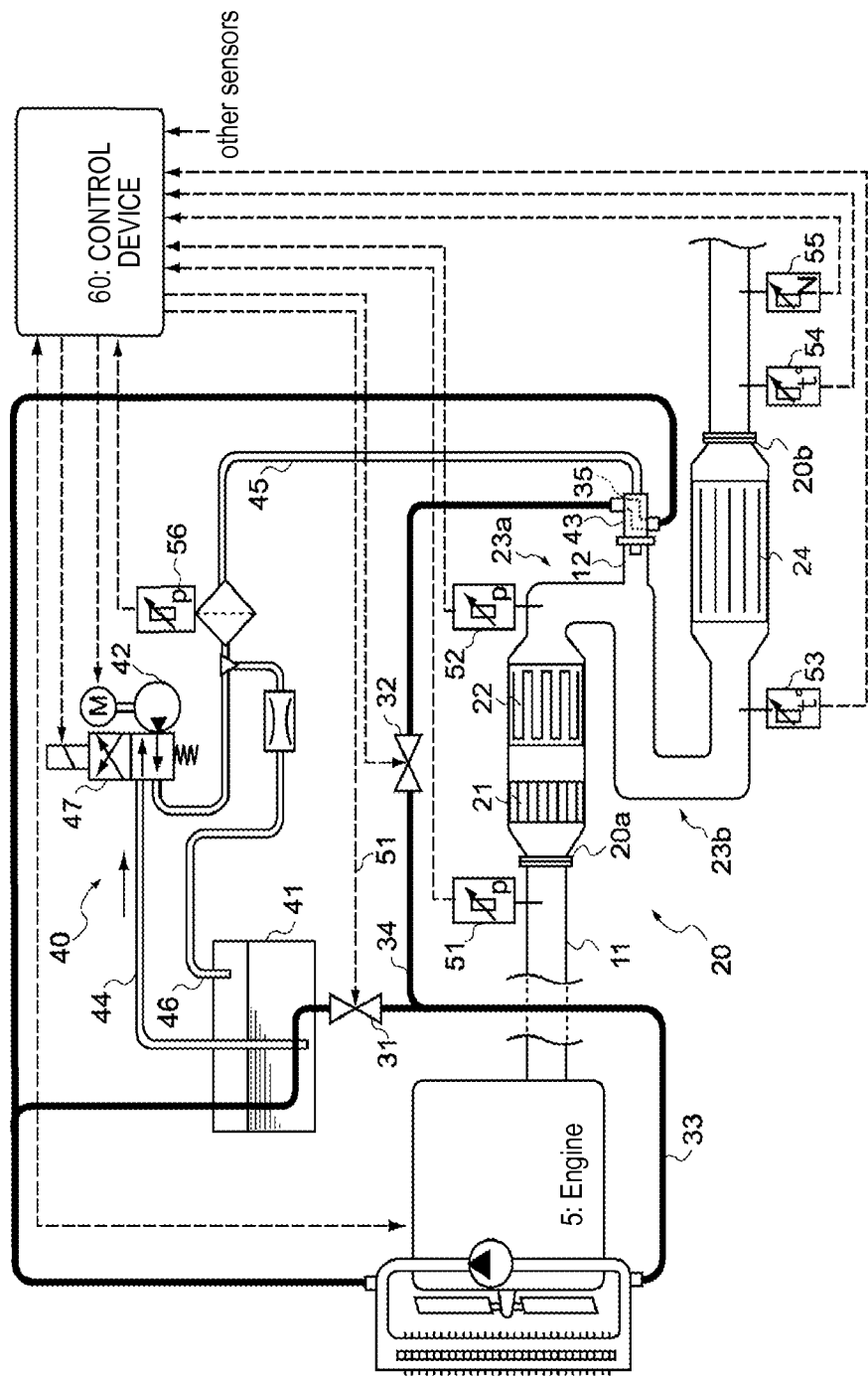
FIG. 1 is a general view showing a configuration example of an exhaust purification system according to an embodiment of the invention.

Hereinafter, referring to the drawings, an embodiment of an exhaust purification system and a method for controlling an exhaust purification system according to the invention will be described in detail.

However, the embodiment below shows an aspect of the invention and does not limit the invention. The embodiment may be arbitrarily modified within the scope of the invention.

Note that, the same members or parts are denoted by the same letters or numerals in the drawings, and the description thereof will not be repeated appropriately.

1. Exhaust Purification System (1) Entire Configuration

FIG. 1 shows an entire configuration of an exhaust purification system (hereinafter, simply referred to as a "system") 10 according to the embodiment.

The system 10 mainly includes an exhaust purification unit 20 which includes a DPF 22 and an SCR catalyst 24, a reducing agent supply device 40 which includes a reducing agent injection valve 43, and a control device 60 which performs forced regeneration control of the DPF 22 or operation control of the reducing agent supply device 40.

Such a system 10 is configured as an apparatus which collects PM in an exhaust gas by the DPF 22 and uses an aqueous urea solution as a reducing agent so as to selectively purify $NO_x$ in the exhaust gas using the SCR catalyst 24.

(2) Exhaust Purification Unit

The exhaust purification unit 20 includes an oxidization catalyst 21, the DPF 22, and the SCR catalyst 24 in this order from the exhaust upstream side.

Among the components of the exhaust purification unit 20, the oxidization catalyst 21 oxidizes an unburned fuel supplied into an exhaust pipe 11 by post-injection or the like in an internal combustion engine 5 and generates oxidization heat. Accordingly, the DPF 22 may be heated by increasing the temperature of the exhaust gas flowing into the DPF 22. As the oxidization catalyst 21, a known catalyst, for example, a catalyst which is formed by adding a predetermined amount of a rare-earth element such as cerium to alumina carrying platinum may be used.

Further, the DPF 22 collects PM in the exhaust gas when the exhaust gas passes through the DPF 22. In the system 10 shown in FIG. 1, the DPF 22 is disposed at the exhaust upstream side in relation to the SCR catalyst 24, and hence there is no possibility that the PM may adhere to the SCR catalyst 24. As the DPF 22, an existing DPF, for example, a filter with a honeycomb structure which is formed of a ceramic material may be used.

Further, the SCR catalyst 24 absorbs ammonia which is generated by a decomposition of an aqueous urea solution injected into an exhaust gas by the reducing agent injection valve 43 and reduces $NO_x$ in the inflowing exhaust gas. The SCR catalyst 24 has, for example, an ammonia absorbing function, and a zeolite-based reducing catalyst which may selectively reduce $NO_x$ may be used.

The above-described exhaust purification unit 20 includes pressure sensors 51 and 52 which are respectively provided before and after the DPF 22, and includes temperature sensors 53 and 54 which are respectively provided before and after the SCR catalyst 24. Further, a $NO_x$ sensor 55 is provided at the exhaust downstream side of the SCR catalyst 24. Further, an external air temperature sensor which detects an external air temperature is disposed around the exhaust purification unit.

The sensor values of the sensors are sent to the control device 60, and the pressure, the temperature, or the $NO_x$ concentration at each position is detected.

Furthermore, these sensors may not be provided if the calculation estimation may be performed.

Further, the above-described exhaust purification unit 20 includes a connection pipe 12 which is branched from a first curved portion 23a of the exhaust pipe 11 and fixes the reducing agent injection valve 43. Through the connection pipe 12, the aqueous urea solution is injected from the reducing agent injection valve 43 in a direction substantially matching the flow direction of the exhaust gas.

Accordingly, compared to the case where the reducing agent injection valve 43 is directly fixed to the exhaust pipe 11, heat may not be easily transmitted from the exhaust pipe 11, the exhaust gas, or the like to the reducing agent injection valve 43.

(3) Forced Regeneration Unit

Here, the system 10 of the embodiment includes a forced regeneration unit which performs forced regeneration control of the DPF 22. This is because the temperature of the DPF 22 is raised to about 500° C. to 600° C. and the PM deposited on the DPF 22 is forcedly burned.

In the embodiment, the forced regeneration unit includes the fuel injection valve (not shown) which supplies the unburned fuel into the exhaust pipe 11 by the post-injection or the like in the internal combustion engine 5, the control unit of the control device 60 which instructs the control of the fuel injection valve with respect to the amount or the timing of the fuel injected from the fuel injection valve, and the oxidization catalyst 21 which oxidizes the unburned fuel and generates the oxidization heat.

Note that, the forced regeneration unit is not limited to the above-described example, and a unit may be employed which increases the temperature of the exhaust gas to about 500 to 600° C. For example, the forced regeneration unit may be configured by a device which supplies the unburned fuel to the oxidization catalyst 21 without the post-injection. Further, a heating device such as a burner or a heating wire may be provided so as to directly heat the DPF 22.

(4) Reducing Agent Supply Device

Further, the reducing agent supply device 40 mainly includes a storage tank 41 which stores an aqueous urea solution, a pressure-feeding pump 42, and a reducing agent injection valve 43.

Among these, the storage tank 41 and the pressure-feeding pump 42 are connected to each other by a first supply path 44, and the pressure-feeding pump 42 and the reducing agent injection valve 43 are connected to each other by a second supply path 45. The second supply path 45 is provided with a pressure sensor 56, and the sensor value is transmitted to the control device 60, so that the pressure inside the second supply path 45 is detected.

Further, the second supply path 45 and the storage tank 41 are connected to each other by a third supply path 46. Accordingly, an extra aqueous urea solution which is supplied to the second supply path 45 may be returned to the storage tank 41.

Further, the reducing agent supply device 40 includes a reverting valve 47 which has a function of switching the passageway of the aqueous urea solution from a forward direction from the storage tank 41 toward the reducing agent injection valve 43 to a backward direction from the reducing agent injection valve 43 toward the storage tank 41.

That is, the system 10 of the embodiment has a configuration in which the aqueous urea solution charged in the reducing agent supply device 40 is collected into the storage tank 41 when the internal combustion engine 5 is stopped.

Among the components of the reducing agent supply device 40, the pressure-feeding pump 42 pumps the aqueous urea solution inside the storage tank 41 so that the pressure inside the second supply path 45 is maintained at a predetermined value and pressure-feeds the aqueous urea solution to the reducing agent injection valve 43. As the pressure-feeding pump 42, an electric pump is typically used.

Further, the reducing agent injection valve 43 injects the aqueous urea solution into the exhaust pipe 11 when the reducing agent injection valve 43 is opened by a control signal output from the control device 60. As the reducing agent injection valve 43, for example, an ON-OFF valve of which the valve opening ON-OFF state is controlled by DUTY control is used.

An electronic part or a resin part which constitutes the reducing agent injection valve 43 is comparatively weak against heat, where the heatproof temperature Tlim is about 140 to 150° C. and the exhaust gas temperature during the normal operation is about 200 to 300° C.

For this reason, the reducing agent supply device 40 includes a cooling water path 35 which is provided in a housing of the reducing agent injection valve 43, cooling water circulation paths 33 and 34 which are branched from the cooling water path 33 of the internal combustion engine 5 and communicate with the cooling water path 35, and cooling water flow amount control valves 31 and 32 which adjust the flow amount of the cooling water flowing in the cooling water circulation paths 33 and 34.

Accordingly, the cooling water of the internal combustion engine 5 is circulated in the cooling water path 35 of the reducing agent injection valve 43 so as to maintain the temperature of the reducing agent injection valve 43 at about 70 to 80° C., thereby preventing the thermal damage of the reducing agent injection valve 43.

Further, since the aqueous urea solution which has a relatively low temperature inside the storage tank 41 is pressure-fed to the reducing agent injection valve 43 with the injection of the reducing agent from the reducing agent injection valve 43, the heat radiation of the reducing agent injection valve 43 is prompted even by the heat transfer to the aqueous urea solution.

The heat radiation capability of the reducing agent injection valve 43 by the circulation of the engine cooling water or the heat transfer of the aqueous urea solution is particularly exhibited during the operation of the internal combustion engine 5.

This is because the engine cooling water is circulated during the operation of the internal combustion engine 5 and the aqueous urea solution is pressure-fed to the reducing agent injection valve 43 during the operation of the internal combustion engine 5.

(5) Temperature Raising Unit

Here, the system 10 of the embodiment includes a temperature raising unit which raises the temperature of the reducing agent injection valve 43. This is provided to clear the blockage of the reducing agent injection valve 43, caused by the solidification of the aqueous urea solution occurring when heating and cooling the aqueous urea solution inside the reducing agent injection valve 43, through the melting by an increase in temperature.

As the temperature raising unit, as an example, the actual forced regeneration unit of the DPF 22 is used as the temperature raising unit.

Further, the temperature raising unit is not limited to the above-described example. For example, the burner, the heating wire, or the like may be provided so as to heat the aqueous urea solution of the reducing agent injection valve 43, and the control unit of the control device 60 for controlling the fuel supply amount to the burner or the electricity supply amount to the heating wire may be provided, so that these components constitute the temperature raising unit.

In addition, when the cooling water flow amount control valve 32 is controlled in the valve closing direction so as to decrease the flow amount of the cooling water flowing in the cooling water path 35 provided in the housing of the reducing agent injection valve 43, an increase in the temperature of the reducing agent injection valve 43 may be prompted.

Accordingly, when the cooling water flow amount control valve 32 is controlled in the valve closing direction along with the control of the temperature raising unit, the temperature rise speed of the reducing agent injection valve 43 may increase and the temperature of the reducing agent injection valve 43 may be promptly increases to the target value Ttgt.

2. Control Device (1) Entire Configuration

Next, referring to FIG. 2, the control device 60 which is provided in the system 10 of the embodiment will be described in detail as an operation state detecting unit 61, a temperature detecting unit 62, a forced regeneration control unit 63, a condition establishment determining unit 64, a data storage unit 65, and a blockage-clearing control unit 66. Specifically, these respective units are realized by the implementation of a program using a microcomputer.

Figure 2:
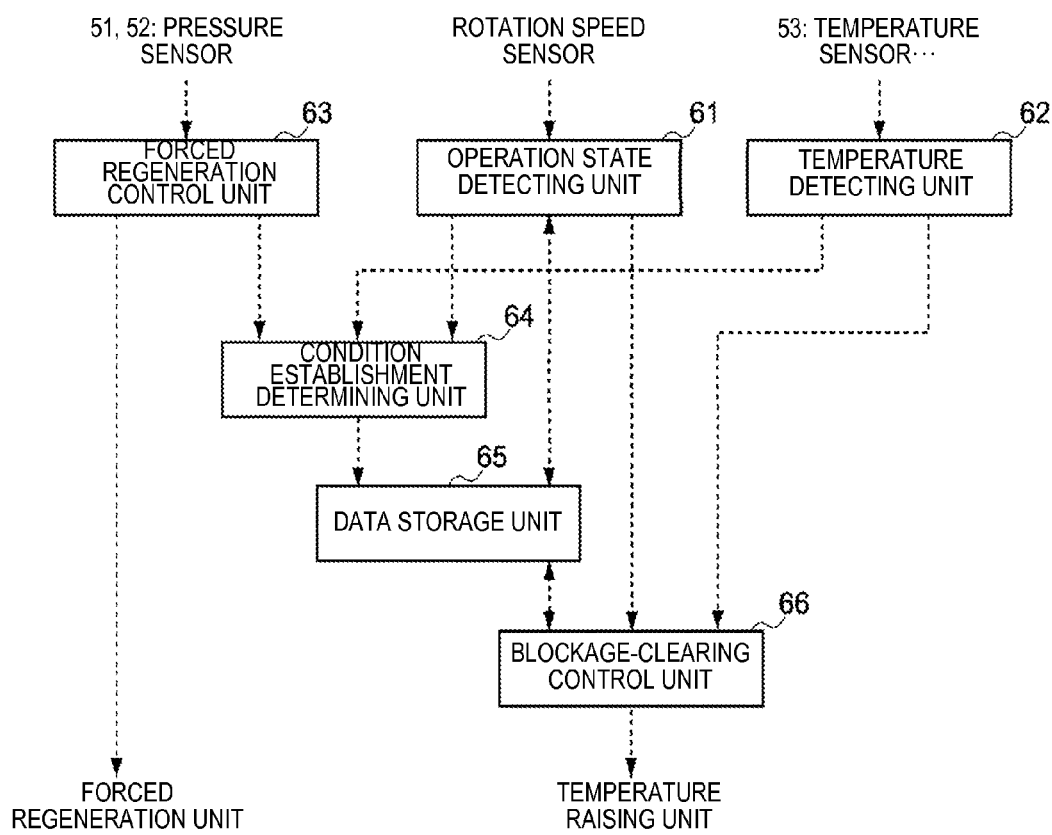
FIG. 2 is a block diagram showing a configuration example of a control device provided in the exhaust purification system.

That is, FIG. 2 is a configuration example showing the components, clearing the blockage of the reducing agent injection valve 43 caused by the solidification of the aqueous urea solution in the control device 60 provided in the system 10, as a functional block.

The control device 60 is configured to read various sensor signals of a rotation speed sensor which detects an engine rotation speed Ne, a vehicle speed sensor which detects a vehicle speed V of the vehicle, an accelerator sensor which detects an operation amount Acc of an accelerator pedal, and a brake sensor which detects a brake amount Brk of a brake pedal as well as the respective pressure sensors or the respective temperature sensors. Further, the control device 60 is provided with a RAM (Random Access Memory) which is not shown in the drawings and stores the calculation results or the detection results of the respective components.

During the operation of the internal combustion engine 5, the control device 60 controls the driving of the pressure-feeding pump 42 so that the pressure inside the second supply path 45 is maintained at a predetermined value and controls the driving of the reducing agent injection valve 43 based on the engine rotation speed Ne or the sensor value of the $NO_x$ sensor 55 which is provided at the exhaust downstream side of the SCR catalyst.

Further, the control device 60 performs a purging process when the internal combustion engine 5 is stopped. Specifically, a signal of switching the passageway of the aqueous urea solution from the forward direction to the backward direction is output to the reverting valve 47, and a signal of opening the reducing agent injection valve 43 and driving the pressure-feeding pump 42 is output to the pressure-feeding pump 42 and the reducing agent injection valve 43.

Note that, the control device 60 may perform the function necessary for the system 10 of the embodiment even after the internal combustion engine 5 is stopped.

(2) Operation State Detecting Unit

The operation state detecting unit 61 may detect the starting and the stopping of the internal combustion engine 5. The starting and the stopping of the internal combustion engine 5 may be detected based on whether the engine rotation speed Ne is 0 or the ON-OFF information of the ignition switch.

(3) Temperature Detecting Unit

Further, the temperature detecting unit 62 is used to detect the reducing agent injection valve temperature Tudv, but when the temperature may not be directly detected, the temperature may be obtained from the downstream temperature Tdpf of the DPF 22.

(4) Forced Regeneration Control Unit

The forced regeneration control unit 63 estimates the sedimentation amount Vpm of the PM based on the differential pressure obtained from the pressure sensors 51 and 52 provided before and after the DPF 22. Then, when the estimated PM sedimentation amount Vpm exceeds the predetermined threshold value Vpm0, it is determined that the forced regeneration of the DPF 22 is needed, and a signal of performing the forced regeneration is transmitted to the forced regeneration unit.

Meanwhile, the forced regeneration control unit 63 stops a signal of performing the forced regeneration, which is transmitted to the forced regeneration unit, when the estimated PM sedimentation amount Vpm decreases to a predetermined amount.

(5) Condition Establishment Determining Unit

When the internal combustion engine 5 is stopped, the condition establishment determining unit 64 determines whether the aqueous urea solution inside the reducing agent injection valve 43 may be solidified later.

Since the circulation of the cooling water of the internal combustion engine 5 is stopped when the internal combustion engine 5 is stopped, the heat radiation capability of the reducing agent injection valve 43 is not effectively exhibited, and the temperature of the aqueous urea solution inside the reducing agent injection valve 43 increases, so that the evaporation of the water content therein intensively occurs. Then, the concentration of the aqueous urea solution increases, and hence the solidification temperature T0 of the aqueous urea solution also increases. Accordingly, when it is estimated that the temperature of the aqueous urea solution is lower than the solidification temperature T0 in the cooling period after stopping the internal combustion engine 5, it is determined that the aqueous urea solution is solidified.

As the more specific determination condition, it is determined whether the internal combustion engine 5 is stopped during the forced regeneration of the DPF 22 or within a predetermined period after the forced regeneration.

That is, as a result of the high-temperature state due to the forced regeneration heat at the exhaust downstream side of the DPF 22 or the residual heat after regeneration, the concentration of the aqueous urea solution in the reducing agent injection valve 43 increases and the solidification temperature T0 increases. Accordingly, it is possible to detect the possibility that the aqueous urea solution may be solidified in the subsequent cooling state.

Specifically, it is determined whether the stopping of the internal combustion engine 5 is detected by the operation state detecting unit 61 until a signal of stopping the forced regeneration is transmitted from the forced regeneration control unit 63 after a signal of starting the forced regeneration is transmitted therefrom or within a predetermined period after a signal of stopping the forced regeneration is transmitted from the forced regeneration control unit.

Here, the predetermined period is a period in which the high heat influence caused by the residual heat after the forced regeneration arrives at the reducing agent injection valve 43. Then, since the predetermined period is different depending on the distance from the DPF 22 to the reducing agent injection valve 43 or the thermal capacity of the exhaust pipe, it is desirable to determine the predetermined period by the result of the test using the actual equipment. That is, the predetermined time may be determined in a manner such that the test is actually performed by changing the time until the internal combustion engine 5 is stopped after the forced regeneration is ended and it is checked whether the aqueous urea solution inside the reducing agent injection valve 43 is solidified in each case.

Further, as a different determination condition, it is determined whether there is a possibility of the solidification of the aqueous urea solution based on the reducing agent injection valve temperature Tudv, the temperature gradient δTudv, or the external air temperature Tout after starting the forced regeneration. When the reducing agent injection valve temperature Tudv is high, the water content in the aqueous urea solution evaporates, the concentration thereof increases, and then the solidification temperature T0 increases. Accordingly, there is an increasing possibility of the solidification of the aqueous urea solution after the cooling state. Further, even when the temperature gradient δTudv of the reducing agent injection valve is large or the external air temperature Tout is high, there is an increasing possibility of the solidification of the aqueous urea solution. Accordingly, the determination may be made based on these references or the appropriate combination of the reducing agent injection valve temperature Tudv with these references.

Here, the reducing agent injection valve temperature Tudv used for the determination may be the temperature at the time point and the estimated arrival temperature. Further, the temperature may be the reducing agent injection valve arrival maximum temperature Tudvmax shown in FIG. 3.

The specific value may be determined in a manner such that an actual test is performed and it is determined whether the aqueous urea solution in the reducing agent injection valve 43 is solidified by changing the conditions of the reducing agent injection valve temperature Tudv, the temperature gradient δTudv, and the external air temperature Tout in various ways. In addition, when the reducing agent injection valve temperature Tudv exceeds about 100° C., there is an increasing possibility that the aqueous urea solution may be solidified in the later cooling state.

(6) Data Storage Unit

Further, the data storage unit 65 stores a determination result as data when it is determined that the aqueous urea solution inside the reducing agent injection valve 43 may be solidified later when stopping the internal combustion engine 5 by the condition establishment determining unit 64. For example, the condition establishment flag is set to 1 when it is determined that the possibility of the solidification is present and the condition establishment flag is set to 0 in the opposite case. Note that, when the solidification temperature T0 of the aqueous urea solution is estimated by the condition establishment determining unit 64, it is desirable to store the solidification temperature T0 as the data. This is because the more appropriate control for clearing the solidification of the aqueous urea solution as fast as possible may be performed on the ground that the target temperature Ttgt may be determined based on the solidification temperature T0 when the temperature raising unit is operated by the blockage-clearing control unit 66 to be described later. In the embodiment, the data is stored in the RAM of the control device 60.

(7) Blockage-Clearing Control Unit

Further, in a case where the condition establishment flag is 1 when starting the internal combustion engine 5, the blockage-clearing control unit 66 outputs a signal of operating the temperature raising unit and raises the reducing agent injection valve temperature Tudv to the target temperature Ttgt in which the solidification may be solved.

As an example, the blockage-clearing control unit 66 may be configured to operate the temperature raising unit, to read the reducing agent injection valve temperature Tudv, to control the temperature raising unit so that the reducing agent injection valve temperature Tudv becomes the target temperature Ttgt, and to maintain the state for a predetermined time in consideration of the time in which the solidified aqueous urea solution is melted.

Further, only the temperature raising unit may be operated for a predetermined time without reading the reducing agent injection valve temperature Tudv or setting the target temperature Ttgt. In this case, the predetermined time may be determined by the actual test in consideration of the heatproof temperature Tlim and the like.

Here, when the solidification temperature T0 of the aqueous urea solution is stored in the data storage unit 65, it is desirable to set the target temperature Ttgt to a temperature slightly higher than the solidification temperature T0 in the range not exceeding the heatproof temperature Tlim of the reducing agent injection valve. Furthermore, when the solidification temperature T0 is not present in the data storage unit 65, the target temperature Ttgt is selected as an appropriate temperature in the range not exceeding the heatproof temperature Tlim.

3. Control Method

Hereinafter, a specific example of a control method which may be performed by the control device will be described by referring to the timing chart and the flowchart.

Figure 3:
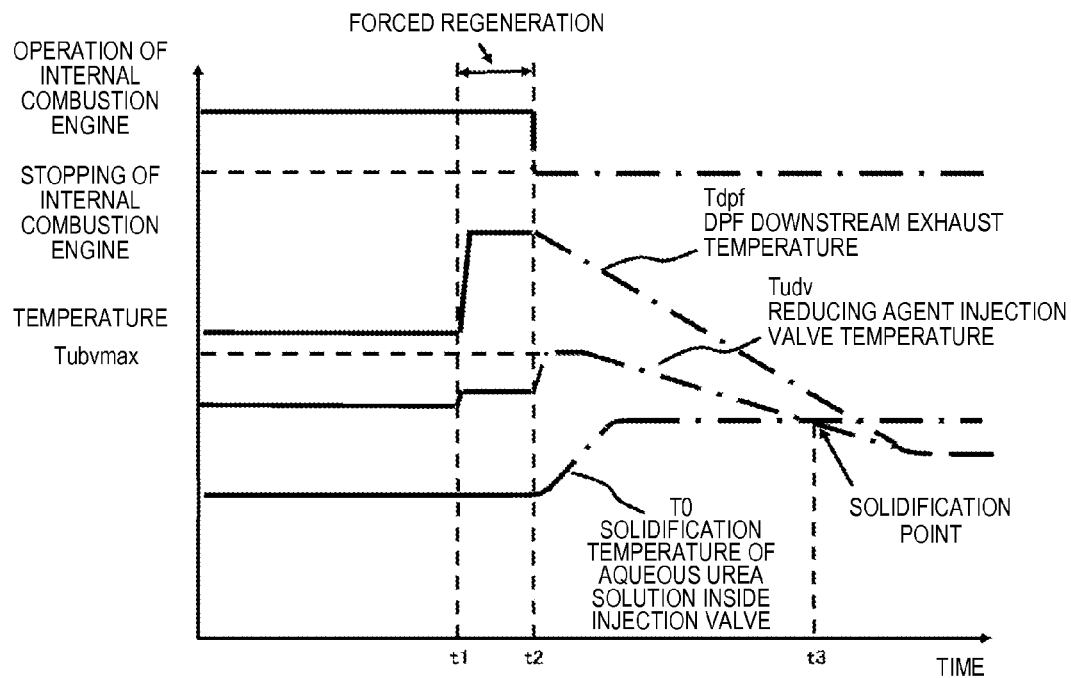
FIG. 3 is a timing chart showing a method for controlling the exhaust purification system.

FIG. 3 is a timing chart showing a change in the DPF downstream exhaust temperature Tdpf, the reducing agent injection valve temperature Tudv, or the solidification temperature T0 of the aqueous urea solution inside the reducing agent injection valve 43 when stopping the internal combustion engine 5 during the forced regeneration of the DPF 22.

Figure 4:
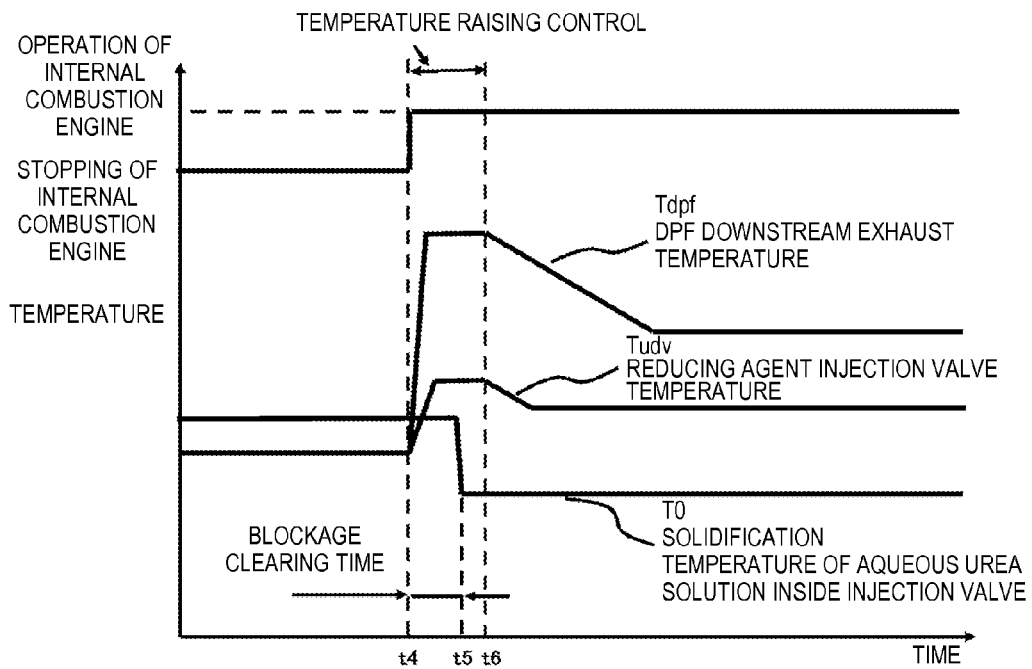
FIG. 4 is a timing chart showing the method for controlling the exhaust purification system.

Further, FIG. 4 is a timing chart showing a change in the DPF downstream exhaust temperature Tdpf, the reducing agent injection valve temperature Tudv, or the solidification temperature T0 of the aqueous urea solution inside the reducing agent injection valve 43 when restarting the engine after the solidification of the aqueous urea solution inside the reducing agent injection valve.

Figure 5:
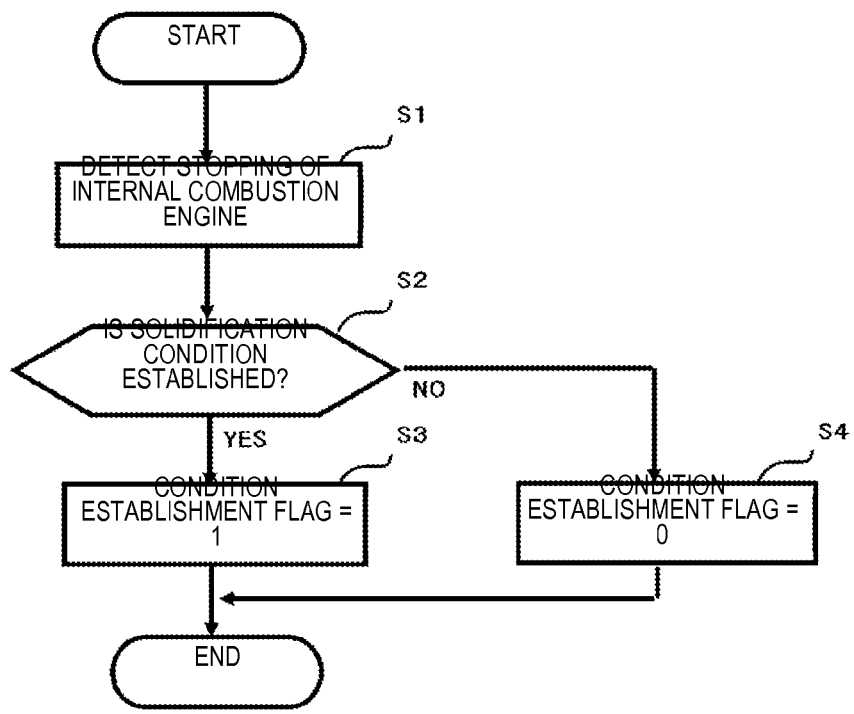
FIG. 5 is a flowchart showing the method for controlling the exhaust purification system.
Figure 6:
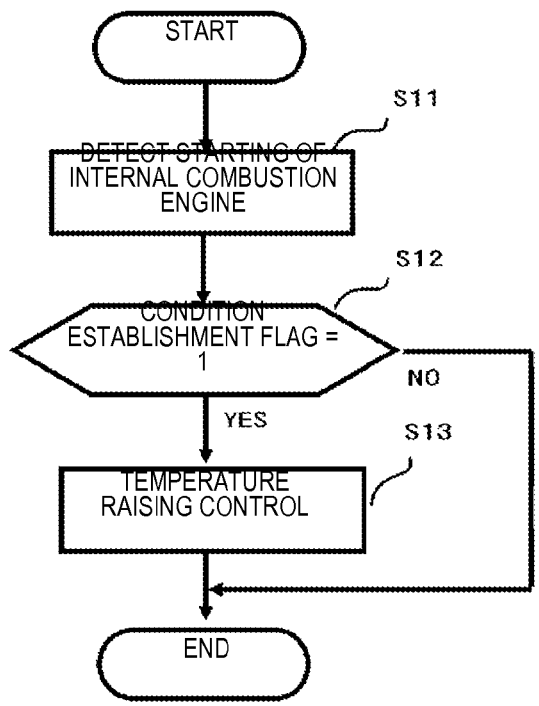
FIG. 6 is a flowchart showing the method for controlling the exhaust purification system.

FIG. 5 shows a flowchart of the calculation process in the control device 60 when stopping the internal combustion engine 5, and FIG. 6 shows a flowchart of the calculation process in the control device 60 when starting the internal combustion engine 5.

First, when the forced regeneration of the DPF 22 is started at t1 of FIG. 3, the DPF downstream exhaust temperature Tdpf increases by the regeneration heat of the forced regeneration. In a state where the forced regeneration is not performed, the DPF downstream exhaust temperature Tdpf is generally about 200 to 300° C. However, when the forced regeneration is started, the DPF downstream exhaust temperature Tdpf arrives at about 500 to 600° C.

Accordingly, the reducing agent injection valve temperature Tudv also increases. However, in a state where the internal combustion engine 5 is driven, the engine cooling water is circulated in the cooling water path 35 of the housing of the reducing agent injection valve 43. Further, since the relative low-temperature aqueous urea solution inside the storage tank 41 is pressure-fed to the reducing agent injection valve 43, the reducing agent injection valve temperature Tudv does not increase to a predetermined temperature or more. Since a new aqueous urea solution is also supplied, the concentration does not increase, and a change amount of the solidification temperature T0 of the aqueous urea solution inside the reducing agent injection valve 43 is small.

In step S1 of FIG. 5, when the control device 60 detects the stopping of the internal combustion engine 5, the routine proceeds to step S2 so as to determine whether the solidification condition is established. That is, it is determined whether there is a possibility of the solidification of the aqueous urea solution in the cooling state after stopping the internal combustion engine 5.

A specific example of the determination method will be described later based on FIGS. 7 and 8.

When it is determined that such a possibility is present, the routine proceeds to step S3 so as to set the condition establishment flag to 1 and the routine ends. Further, when there is no possibility of the solidification of the aqueous urea solution, the routine proceeds to step S4 so as to set the condition establishment flag to 0 and the routine ends.

Returning to FIG. 3, a method of determining the establishment of the solidification condition will be described in detail. The estimation of each subsequent temperature change at the time point of t2 in which the internal combustion engine 5 is stopped is indicated by the one-dotted chain line in FIG. 3. Since the exhaust downstream temperature Tdpf of the DPF 22 gradually decreases and the circulation of the cooling water of the internal combustion engine 5 is stopped, the heat radiation capability of the reducing agent injection valve 43 is not effectively exhibited. Then, since the reducing agent injection valve temperature Tudv increases while the temperature of the exhaust downstream temperature Tdpf of the DPF 22 is high and a new aqueous urea solution is not supplied, it is estimated that the concentration of the aqueous urea solution inside the reducing agent injection valve 43 increases and the solidification temperature T0 of the aqueous urea solution also increases.

Then, when it is estimated that the reducing agent injection valve temperature Tudv is lower than the increased solidification temperature T0 in the cooling state, it is determined that there is a possibility of the solidification of the aqueous urea solution inside the reducing agent injection valve 43. It is estimated that the reducing agent injection valve temperature Tudv is lower than the solidification temperature T0 at the time point t3 in FIG. 3 and the solidification of the aqueous urea solution inside the reducing agent injection valve 43 starts.

Further, FIG. 7 is a flowchart showing the stopping state of the internal combustion engine 5 including one specific solidification condition establishment determination.

In step S21, when the control device 60 detects the stopping of the internal combustion engine 5, the routine proceeds to step S22 so as to determine whether it is the forced regeneration state of the DPF 22 or within a predetermined period after the forced regeneration. When it is the forced regeneration state of the DPF 22 or within a predetermined period after the forced regeneration, the routine proceeds to step S23 so as to set the condition establishment flag to 1 and the routine ends. Further, when it is not the forced regeneration state of the DPF 22 and the predetermined period after the forced regeneration, the routine proceeds to step S24 so as to set the condition establishment flag to 0 and the routine ends.

Further, FIG. 8 is a flowchart showing the stopping state of the internal combustion engine 5 including one specific solidification condition establishment determination different from FIG. 7.

In step S31, when the control device 60 detects the stopping of the internal combustion engine 5, the routine proceeds to step S32 so as to determine whether the reducing agent injection valve temperature Tudv is higher than the threshold value Ts. When the reducing agent injection valve temperature Tudv is equal to or higher than the threshold value Ts, the routine proceeds to step S33 so as to set the condition establishment flag to 1 and the routine ends. When the reducing agent injection valve temperature Tudv is lower than the threshold value Ts, the routine proceeds to step S34 so as to set the condition establishment flag to 0 and the routine ends.

Here, the reducing agent injection valve temperature Tudv may be the temperature at the time point and the subsequently estimated arrival temperature. Further, the temperature may be the reducing agent injection valve arrival maximum temperature Tudvmax shown in FIG. 3.

Note that, the threshold value Ts is about 100° C.

Next, a case in which the internal combustion engine 5 is started later will be described by referring to FIGS. 4, 6, and 9. First, in step S11 of FIG. 6, when the control device 60 detects the starting of the internal combustion engine 5, the routine proceeds to step S12 so as to determine whether the condition establishment flag is 1. When the condition establishment flag is 1, the routine proceeds to step S13 so as to perform the temperature raising control. In contrast, when the condition establishment flag is 0, it is determined that the condition is not established and the routine ends.

Figure 9:
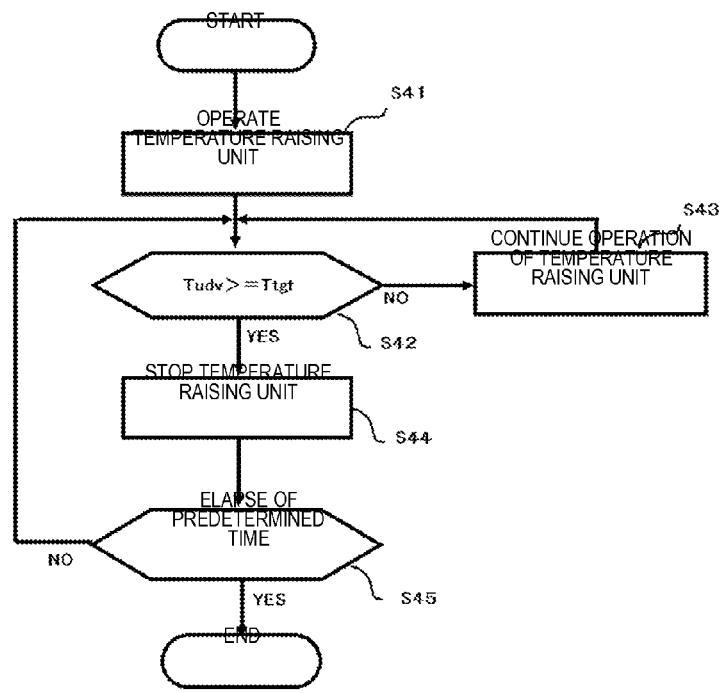
FIG. 9 is a flowchart showing the method for controlling the exhaust purification system.
Figure 10:
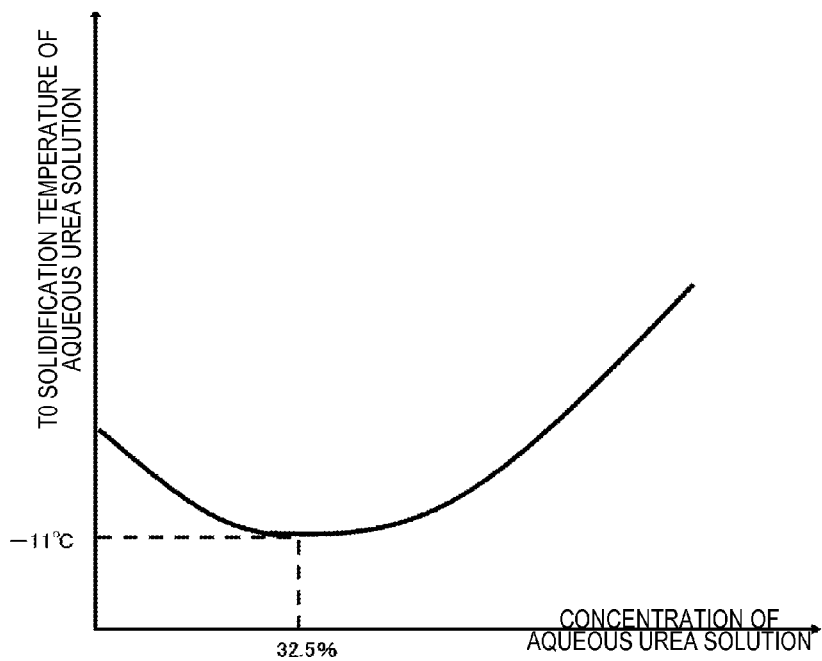
FIG. 10 is a graph showing a relation between a solidification temperature T0 and a concentration of an aqueous urea solution.

FIG. 9 shows an example of a specific method of controlling the temperature raising control in step S13 of FIG. 6. First, in step S41, the temperature raising unit is operated, and the routine proceeds to step S42. In step S42, it is determined whether the reducing agent injection valve temperature Tudv is equal to or higher than the target value Ttgt. When it is determined that the reducing agent injection valve temperature Tudv is lower than the target value Ttgt, the routine proceeds to step S43 so as to continue the operation of the temperature raising unit and the routine returns to step S42 again. Meanwhile, when it is determined that the reducing agent injection valve temperature Tudv is equal to or higher than the target value Ttgt, the routine proceeds to step S44 so as to stop the temperature raising unit. Then, the routine proceeds to step S45 so as to determine whether a predetermined time is elapsed. When the predetermined time is not elapsed, the routine returns to step S42 again. Meanwhile, when the predetermined time is elapsed, the routine ends. Here, when the solidification temperature T0 of the aqueous urea solution is stored as the data, it is desirable to set the target temperature Ttgt to a temperature slightly higher than the solidification temperature T0 in the range not exceeding the heatproof temperature Tlim of the reducing agent injection valve. Note that, when the solidification temperature T0 is not stored as the data, the target temperature Ttgt is selected as an appropriate temperature in the range not exceeding the heatproof temperature Tlim.

Here, a change in the reducing agent injection valve temperature Tudv or the like when starting the engine in a case where the determination condition is established will be described by referring to FIG. 4. When the internal combustion engine 5 is started at the time point of t4, the temperature raising unit is operated since the determination condition is established. Accordingly, the DPF exhaust downstream temperature Tdpf increases and the reducing agent injection valve temperature Tudv also increases. When the temperature of the aqueous urea solution inside the reducing agent injection valve 43 exceeds the solidification temperature T0, the melting of the aqueous urea solution starts. Subsequently, the aqueous urea solution is completely melted at the time point of t5, and the blockage of the reducing agent injection valve 43 is cleared, thereby resuming the appropriate injection of the aqueous urea solution from the reducing agent injection valve 43. Then, the operation of the temperature raising unit is stopped at the time point of t6 after a predetermined time is elapsed.

Note that, when the solidified aqueous urea solution is melted, a new aqueous urea solution arrives at the reducing agent injection valve 43, and hence the concentration is promptly returned to the normal concentration.

Figure 11:
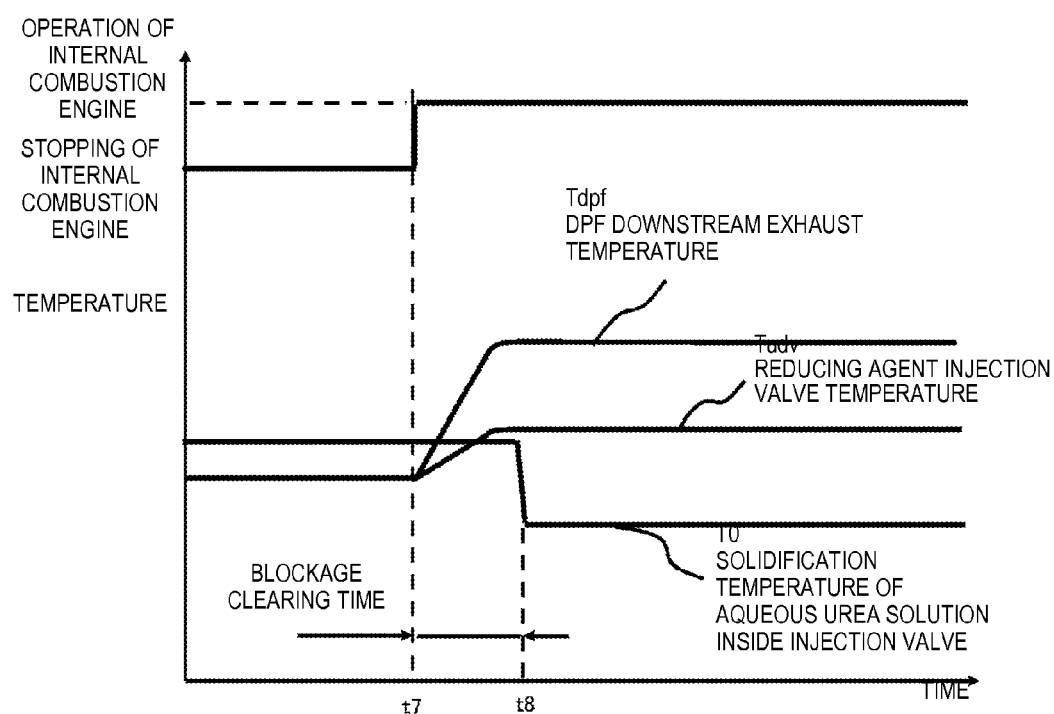
FIG. 11 is a timing chart showing the method for controlling the exhaust purification system according to the related art.

Compared to FIG. 11 as the related art, the solidified aqueous urea solution is promptly melted and the clearing time is shortened by the invention. Accordingly, it is understood that the blockage of the reducing agent injection valve 43 may be cleared soon after starting the engine.

According to the exhaust purification system and the method for controlling the exhaust purification system of the embodiment, it is determined whether there is a possibility of the solidification of the aqueous urea solution remaining inside the reducing agent injection valve 43 when starting the internal combustion engine 5, and when the possibility of the solidification is present, the temperature raising unit is controlled so as to raise the temperature of the reducing agent injection valve 43, thereby clearing the blockage of the reducing agent injection valve 43 soon after starting the engine. Accordingly, even when there is a possibility of the solidification of the aqueous urea solution, degradation in the exhaust purification efficiency may be prevented.

REFERENCE SIGNS LIST

5 Internal combustion engine
10 Exhaust purification system (system)
11 Exhaust pipe
12 Connection pipe
20 Exhaust purification unit
20a, 20b Flange portion
21 Oxidization catalyst
22 Diesel particulate filter (DPF)
23a, 23b Curved portion
24 SCR catalyst
31, 32 Cooling water circulation valve
33, 34 Cooling water circulation path
40 Reducing agent supply device
41 Storage tank
42 Pressure-feeding pump
43 Reducing agent injection valve
44 First supply path
45 Second supply path
46 Third supply path
51, 52 Pressure sensor
53, 54 Temperature sensor
55 $NO_x$ sensor
56 Pressure sensor
60 Control device
61 Operation state detecting unit
62 Temperature detecting unit
63 Forced regeneration control unit
64 Condition establishment determining unit
65 Data storage unit
66 Blockage-clearing control unit

The invention claimed is:

1. An exhaust purification system with a DPF which collects exhaust particulates in an exhaust gas, a reducing agent injection valve which injects an aqueous urea solution as a reducing agent into the exhaust gas, and an SCR catalyst which purifies a NOx in the exhaust gas by using the aqueous urea solution, the DPF, the reducing agent injection valve and the SCR catalyst being provided in sequence from the exhaust upstream side, the exhaust purification system comprising:
   an operation state detecting unit configured to detect starting and stopping of an internal combustion engine;
   a condition establishment determining unit which determines whether there is a possibility of solidification of the aqueous urea solution when the operation state detecting unit detects the stopping of the internal combustion engine;
   a data storage unit which stores a determination result of the condition establishment determining unit as data; and
   a blockage-clearing control unit which activates a forced regeneration unit of the DPF for raising a temperature of the reducing agent injection valve based on the determination result from the data storage unit when starting the internal combustion engine so as to raise the temperature of the reducing agent injection valve.

2. The exhaust purification system according to claim 1, wherein the condition establishment determining unit determines that there is a possibility of solidification of the aqueous urea solution when the stopping of the internal combustion engine is detected while forced regeneration of the DPF is started and ended or within a predetermined period after the forced regeneration is ended.

3. The exhaust purification system according to claim 1, wherein the condition establishment determining unit determines whether there is a possibility of solidification of the aqueous urea solution based on at least one of a temperature of the reducing agent injection valve, a temperature gradient, and an external air temperature when the stopping of the internal combustion engine is detected.

4. A method for controlling an exhaust purification system with a DPF which collects exhaust particulates in an exhaust gas, a reducing agent injection valve which injects an aqueous urea solution as a reducing agent into the exhaust gas, and an SCR catalyst which purifies a NOx in the exhaust gas by using the aqueous urea solution, the DPF, the reducing agent injection valve and the SCR catalyst being provided in order from the exhaust upstream side, the method comprising:
   determining whether there is a possibility of solidification of the aqueous urea solution when stopping of an internal combustion engine is detected and storing a determination result as data; and
   activating a forced regeneration unit of the DPF for raising the temperature of the reducing agent injection valve so as to raise the temperature of the reducing agent injection valve when stored is the data representing the determination result in which there is a possibility of solidification of the aqueous urea solution when starting the internal combustion engine.

5. An exhaust purification system with a DPF which collects exhaust particulates in an exhaust gas, a reducing agent injection valve which injects an aqueous urea solution as a reducing agent into the exhaust gas, and an SCR catalyst which purifies a NOx in the exhaust gas by using the aqueous urea solution, the DPF, the reducing agent injection valve and the SCR catalyst being provided in sequence from the exhaust upstream side, the exhaust purification system comprising:
   a computer configured to
      detect starting and stopping of an internal combustion engine, and
      determine a likelihood of solidification of the aqueous urea solution when stopping of the internal combustion engine is detected and generate a determination result of the likelihood of solidification; and
   a data storage unit connected to the computer and which stores the determination result as data;
   wherein the computer is further configured to activate a fuel injection valve to supply fuel into an exhaust pipe positioned upstream of the DPF to raise a temperature of the reducing agent injection valve based on the data stored in the data storage unit when starting the internal combustion engine.

* * * * *